(12) United States Patent
Kliot

(10) Patent No.: US 6,511,176 B2
(45) Date of Patent: Jan. 28, 2003

(54) EYEGLASS RETAINER WITH FASHION ACCESSORY HAVING CLOSURE MEANS TO HOLD MATERIAL OF THE ACCESSORY SECURELY AGAINST EYEGLASS TEMPLE PIECE

(75) Inventor: Eugene Kliot, New York, NY (US)

(73) Assignee: Visual Impact Film Corporation, New York, NY (US)

( * ) Notice: Subject to any disclaimer, the term of this patent is extended or adjusted under 35 U.S.C. 154(b) by 0 days.

(21) Appl. No.: 09/995,417

(22) Filed: Nov. 26, 2001

(65) Prior Publication Data

US 2002/0085170 A1 Jul. 4, 2002

Related U.S. Application Data

(63) Continuation-in-part of application No. 09/569,703, filed on May 12, 2000, now Pat. No. 6,322,212, which is a continuation-in-part of application No. 09/244,585, filed on Feb. 4, 1999, now Pat. No. 6,062,690.
(60) Provisional application No. 60/296,879, filed on Jun. 8, 2001.

(51) Int. Cl.[7] ................................................ G02C 3/00
(52) U.S. Cl. ........................................ 351/156; 351/157
(58) Field of Search .................................. 351/156, 157, 351/41, 111, 155

(56) References Cited

U.S. PATENT DOCUMENTS 5,528,800 A * 6/1996 Kliot ........................... 351/157

* cited by examiner

Primary Examiner—Hung Xuan Dang
(74) Attorney, Agent, or Firm—Hughes Hubbard & Reed LLP; Ronald Abramson; Sheryl L. Sandridge (57) ABSTRACT

An improved eyeglass retainer is disclosed, having annular closure attaching to the eyeglass frames. In an alternate embodiment, the closure comprises an elastic band that is only partially attached to the front portion of retainer, meaning that the retainer need not be tubular at the attachment point with elastic band. The invention is designed to present an aesthetically pleasing appearance and to maintain a close fit of the retainer material with the eyeglass frames, even in the presence of winds and inertial forces. In alternate embodiments, the closure in combination with protuberances located on the eyeglass temple pieces secures the retainer to the temple pieces. The protuberances may be integral with the eyeglass frames, or may be separately attached.

11 Claims, 10 Drawing Sheets

EYEGLASS RETAINER WITH FASHION ACCESSORY HAVING CLOSURE MEANS TO HOLD MATERIAL OF THE ACCESSORY SECURELY AGAINST EYEGLASS TEMPLE PIECE

This application claims the benefit of my U.S. provisional patent application No. 60/296,879, filed on Jun. 8, 2001, and is a continuation-in-part of my application Ser. No. 09/569,703 filed on May 12, 2000 now U.S. Pat. No. 6,322,212, which is a continuation-in-part of my application Ser. No. 09/244,585 filed on Feb. 4, 1999, issued as U.S. Pat. No. 6,062,690.

BACKGROUND OF THE INVENTION

1. Field of the Invention

This invention generally relates to the field of eyeglass retainer devices which attach or are attached to eyeglass frames, and more specifically to an improved eyeglass retainer having superior performance characteristics during vigorous outdoor activity and which maintains an attractive appearance during hard use.

2. Description of the Related Art

Eyeglass retainers are well-known products which are used to keep glasses from falling off, or to hold them in a hanging position in front of the neck after they have been deliberately taken off. Eyeglass retainers are often used to hold both corrective eyeglasses as well as sunglasses and safety glasses in place during vigorous athletic or outdoor activity such as skiing, in-line skating, jogging, horseback riding, tennis, team sports, etc. Eyeglass retainers are also used with heavy, specialty eyewear. For example, in the medical field, surgeons use "loops" to retain heavy eyewear apparatus during surgery, and in the technology field, eyeglass retainers are used with heavy eyewear such as those carrying embedded cameras, monitors, displays or retinal projectors. Since the retainers are worn on the head, fashion is also an important objective in this field.

Figure 1:
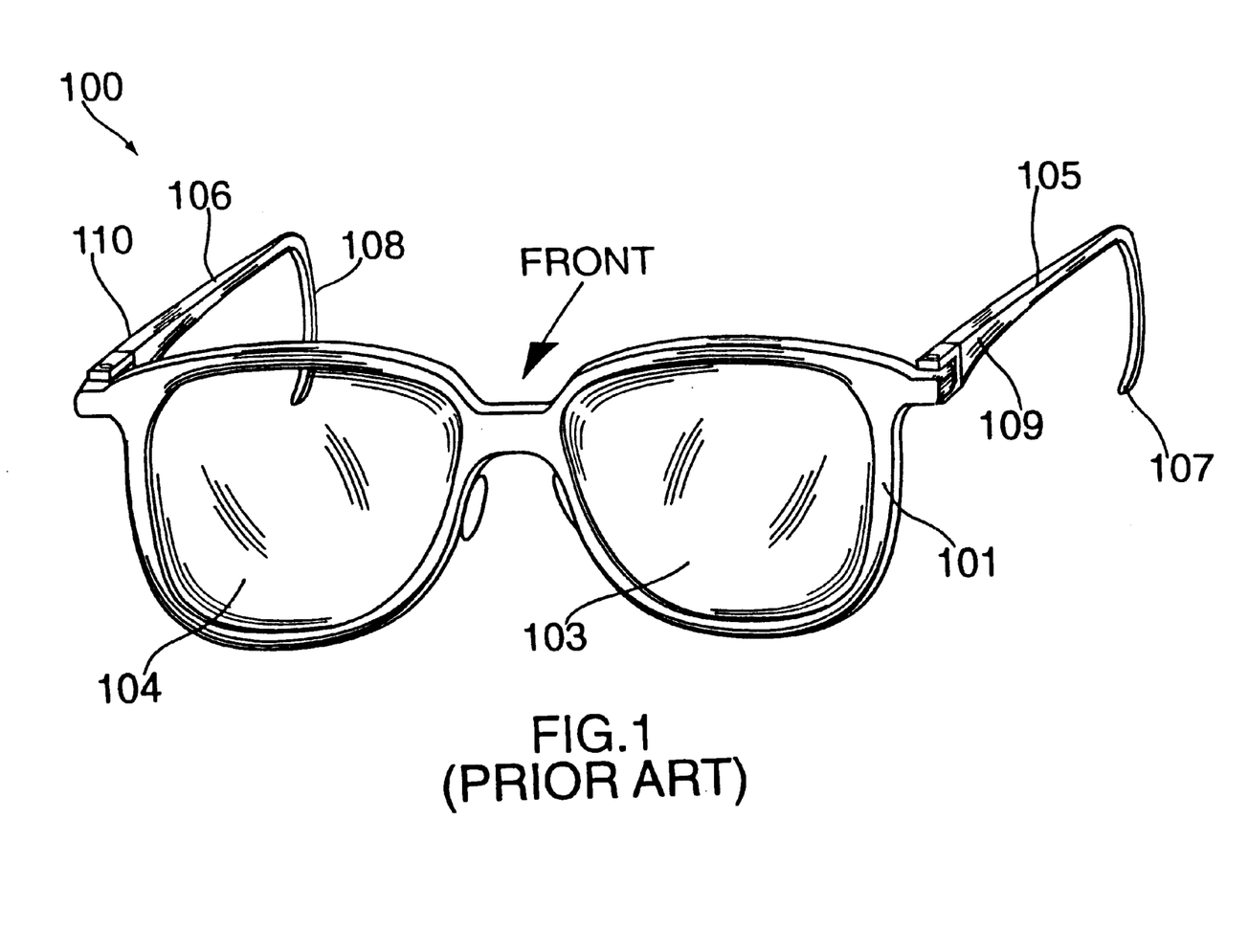
FIG. 1 shows for reference the various parts of an ordinary prior art pair of eyeglasses.

For purposes of the following discussion we will first define, with reference to FIG. 1, terms for the various parts of the components involved:

"Lens holder" means the front portion 101 of the eyeglass frame 100, which holds the lenses 103, 104.

"Temple pieces" means the left and right pieces 105, 106 (which need not necessarily be curved), which attach to the sides of the lens holder and extend back over the wearer's ears;

"Earpiece" means that portion 107, 108 of the temple piece that engages the wearer's ear.

"Front" is defined for purposes hereof with relation to the wearer's head when the glasses and retainers are worn.

Several forms of eyeglass retainers are known in the art.

One variety consists of tubular retainers that slip over the earpieces (107, 108) and hold them by friction. Williams, U.S. Pat. No. 4,696,556; Perry, U.S. Pat. No. 5,181,052; Kalbach, U.S. Pat. No. 5,575,042; McClellan, U.S. Pat. No. 5,181,052. Also Bagley, U.S. Pat. No. 5,092,667. The drawback to all of these implementations is slippage, and in some cases cumbersomeness in getting the retainers on and off during use.

Partially tubular retainers are known, which have front tubular portions that slip over the earpieces but attach by friction in the front area of the temple pieces (109, 110). The tubular portions end to the rear of the point of attachment, opening up, so as to permit the retainers not to follow the earpieces, but rather to extend straight back and be secured around the wearer's head. Linden, DE G 8521724.7. These implementations are again disadvantaged by slippage. In addition, many of the attachment means used in these inventions are unsightly, which can be a strongly negative consideration.

Other non-tubular retainers have been designed that attach in the front area of the temple pieces (109, 110) and then extend straight back so as to be securable around the wearer's head. Wilson, U.S. Pat. No. 5,367,347. Again, slippage is a serious concern with this type of implementation.

Also known are retainers that make a positive attachment to the front areas of the temple pieces, such as by clip (Kliot, U.S. Pat. No. 5,528,800; Tabacchi, U.S. Pat. No. 4,743,105), or hook and loop (Velcro®) fasteners (Girard, FR 2,704, 658), and then extend back so as to be securable around the wearer's head. While these make for a more positive attachment, in most cases the attachment means are exposed and tend to be unsightly.

Cord-like retainers also exist, which are secured to the temple pieces with eyelets, loops or through holes. Barrett, U.S. Pat. No. 5,005,263. These are primarily intended for light duty, indoor use.

Also known are systems akin to goggles which have no temple pieces and in which the retainers attach directly to the lens holder. Tilton, U.S. Pat. No. D 178,328; Bianchi, FR 2,626,188; Daigle, PCT WO 88/0149. While these can be highly functional, they are not adaptable so as to look like ordinary glasses or sunglasses, which is desirable in this type of device.

Figure 2A:
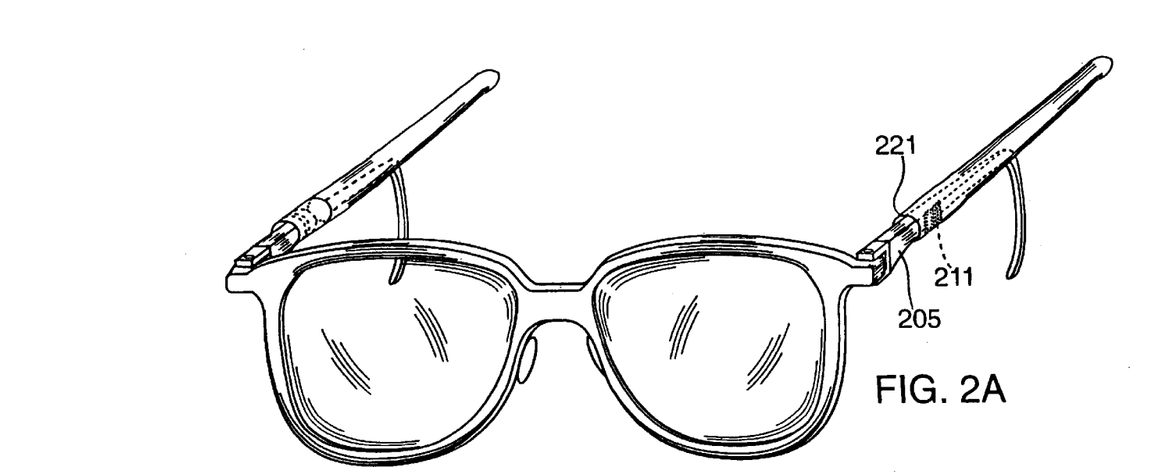
FIG. 2A is a perspective view of the prior art retainer device of Kliot, U.S. Pat. No. 5,528,000.
Figures 2B, 2C:
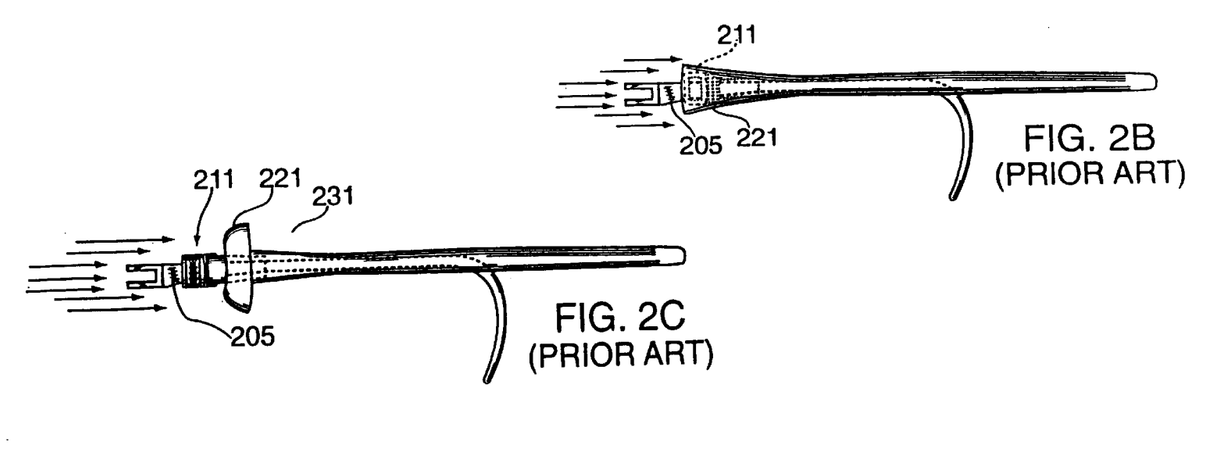
FIG. 2B is a close up partially sectional side view of such device showing a "windsock" effect in a strong headwind.
FIG. 2C is a close up partially sectional side view of such device showing a "blow-back" effect on the retainer in a strong headwind.

My prior patents in this field go further than the other examples. As shown in FIG. 2A, Kliot, U.S. Pat. No. 5,528,800, combines a positive attachment, clip 211, toward the front of the temple piece 205 with a partially tubular structure 221 which fits over and to some extent covers the attachment means 211. However, while this prior patent addresses most of the shortcomings of the other prior art, even it has one significant problem, which is that in a wind, or where the eyeglasses are exposed to inertial forces (e.g., Tennis), the retainer material in tubular portion 221 distorts undesirably, assuming an unsightly "windsock" appearance (231 in FIG. 2B) or pulling such material backward or flipping it over (241 in FIG. 2C) or otherwise distorting it, thereby exposing the attachment means 211 to view. Kliot, U.S. Pat. No. 6,062,690, addresses this shortcoming, but does so with a particular design incorporating a circumferentially attached elastic band (e.g., 351 in FIG. 4).

BRIEF SUMMARY OF THE INVENTION

Accordingly, it is an object of the present invention to provide an improved eyeglass retainer that combines the following advantages:

- It makes a positive, non-slipping connection to the eyeglass frames;
- It may be constructed using frames that are very similar to or identical with those of conventional design;
- The improvement may be utilized in connection with a variety of attachment means and configurations;
- All attachment mechanisms are hidden from view or are aesthetically pleasing; and
- The retainer structure in the area of the point of attachment does not distort due to wind or inertial forces.
- The improved retainer design body enables easier installation and removal, maintaining an attractive appearance during use.

The foregoing and other objects of the invention are accomplished by an improved eyeglass retainer having annular closure means on the respective left and right front portions that each draws the material of the retainer over the attachment means of the retainer, and bunches or constricts it in front of the attachment means, so as to hide said attachment means from view. Further, by drawing over and constricting in front of the attachment means, the closure means maintains a close fit of the retainer material with the eyeglass frames, even in the presence of winds and inertial forces. The retainer material is attached to the elastic band so as to conceal the closure means. In another embodiment, the elastic band also serves as an attachment mechanism, and the temple pieces may include lips or grooves in which the elastic band would sit to maintain a non-slipping connection. In such embodiments, protuberances, such as lips, may be added to temple pieces by using a separate device which attaches to the temple piece and incorporates such protuberances, thus providing a positive attachment means for the retainer. An alternate embodiment involving a wider elastic annular closure means is also described, which conforms to the narrower profile in front of the attachment means, rather than bunching material in front of it. In another embodiment, the retainer is attached to the temple piece in an aesthetically pleasing way, not necessarily hidden from view. In yet another embodiment, an adhesive may be introduced between the temple piece and the inside of the retainer, to provide a non-slipping connection.

The objects of the invention can also be achieved with an elastic band that is only partially attached to the front portion of retainer 321, meaning that the retainer need not be tubular at the attachment point with elastic band 351.

The manner in which the invention achieves these objects is more particularly shown by the drawings enumerated below, and by the detailed description that follows.

BRIEF DESCRIPTION OF THE DRAWINGS

The following briefly describes the accompanying drawings:

FIG. 14a is a side view of an alternate embodiment showing a protuberance as an integral part of an eyeglass temple piece, while

DETAILED DESCRIPTION OF THE PREFERRED EMBODIMENTS

The embodiments of the invention are illustrated in FIGS. 3–5, FIGS. 6–7 and FIGS. 8–14, and described in the text that follows. Although the invention has been most specifically illustrated with particular embodiments, it should be understood that the invention concerns the principles by which such embodiments have been constructed and is by no means limited to the specific configurations shown.

In one embodiment, an elastic band 351 is sewn into the band, to create the front, tubular portion of retainer 321. This elasticized front portion is pulled over the retainer attachment means, shown here as a clip 311. Clip 311 as shown in the embodiment is a two-piece device, in which one piece 312 is affixed to the temple piece and the other 313 slidably clicks into place in a releasable manner, so as to make a positive (though readily releasable) attachment. (There are of course left and right counterparts to these elements, whose presence will be assumed for purposes of the present discussion.)

Figure 4:
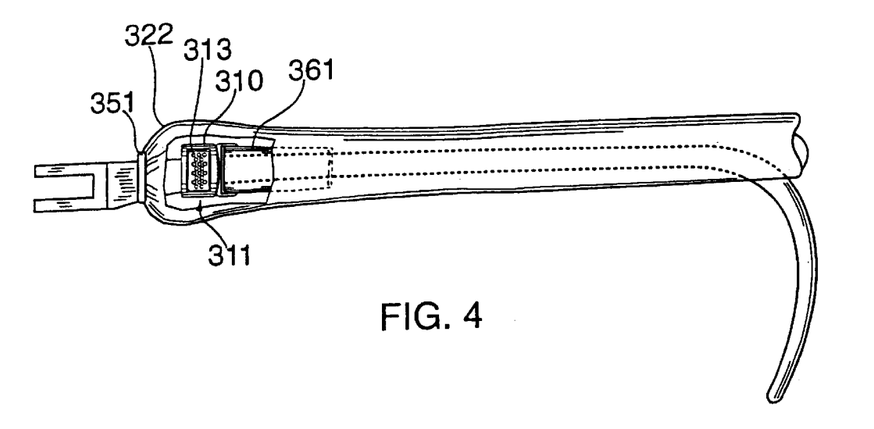
FIG. 4 is a partially sectional side view of the improved retainer device of the preferred embodiment of the present invention as installed on the temple piece of a pair of eyeglasses.

As shown in FIG. 4, when elastic band 351 has been pulled into place, it constricts, and effects a closure over the front of attachment means 311. This in turn bunches the material 322 over the front of attachment means 311. The result is to hide attachment means 311 thoroughly from view, in such a manner that will not be disturbed by wind or inertial forces. Though shown in the embodiment as a narrow, sewn-in elastic band 351, the closure means of the present invention may be any element that provides a circumferential tightening force, such as a drawstring, slipknot, resilient fabric, elastic materials of various widths, hook and loop (Velcro®) fastener or the like. The mechanics of operation can be either to bunch material together 322 (as above) to form a narrower circumference in front of the attachment means 311, thereby positively holding the retainer in place, or alternatively, for example, with the use of wider elastic 551 (FIG. 5), to cause the entire front portion of the retainer to conform to the structure of narrower circumference in front of the attachment means 311, again effecting a positive holding force.

Figure 3:
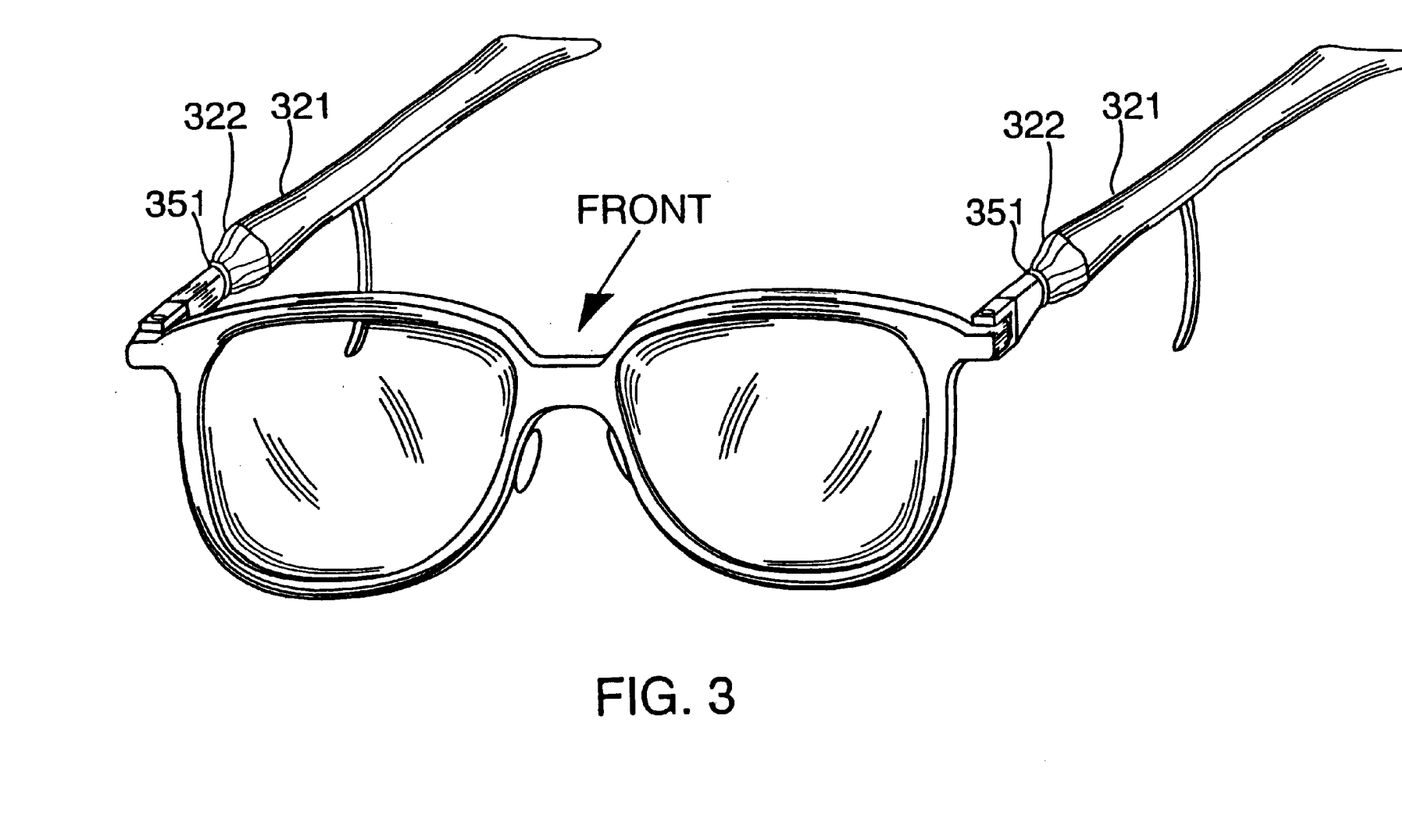
FIG. 3 is a perspective view of the improved retainer of the preferred embodiment present invention, as installed on a pair of eyeglasses.
Figure 5:
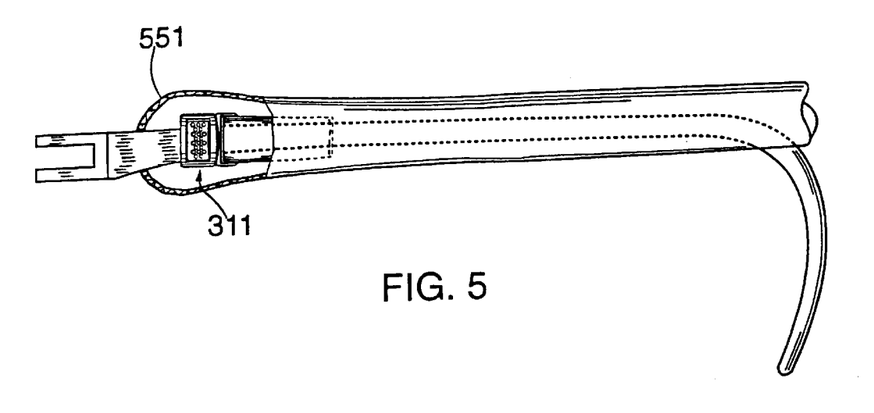
FIG. 5 is a partially sectional side view of an alternate embodiment of the improved retainer device of the present invention as installed on the temple piece of a pair of eyeglasses.
Figure 6:
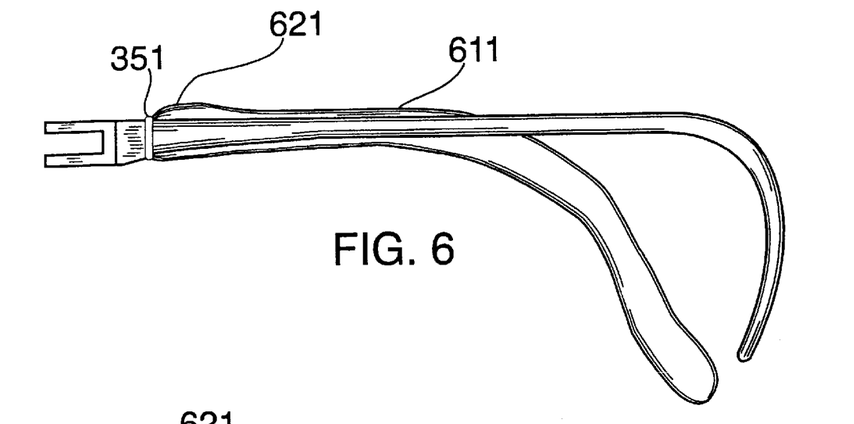
FIG. 6 is a perspective side view of the improved retainer device of an alternatively preferred embodiment of the present invention, as installed on the temple piece of a pair of eyeglasses and viewed from inside the temple piece.
Figure 7:
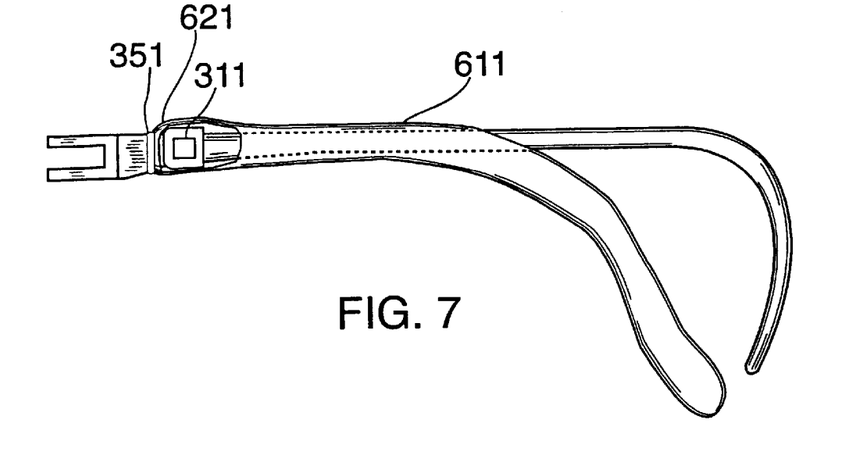
FIG. 7 is a partially sectional side view of the improved retainer device of an alternatively preferred embodiment of the present invention, as installed on the temple piece of a pair of eyeglasses and viewed from outside the temple piece.
Figure 8A:
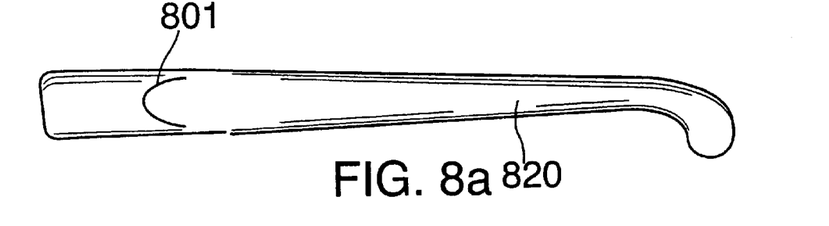
FIG. 8 is a sectional side view of an alternate embodiment of the retainer device showing temple pieces containing lips.
Figure 8B:
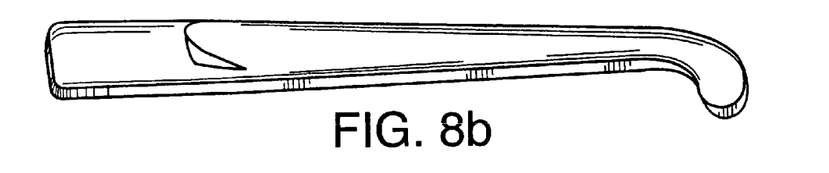
Figure 8C:
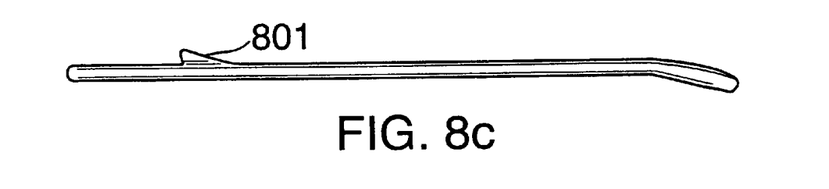
Figure 8D:
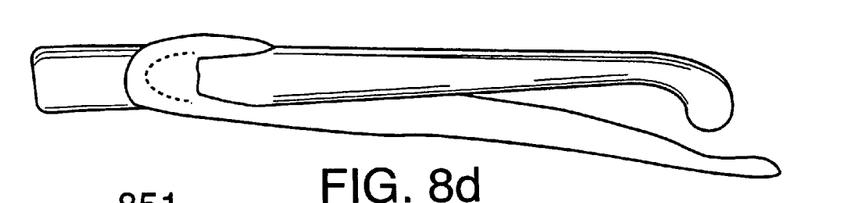
Figure 8E:
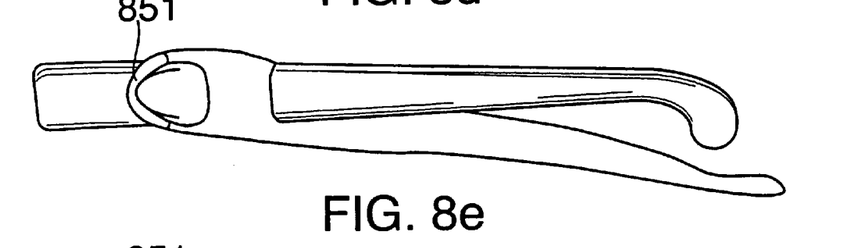
Figure 8F:
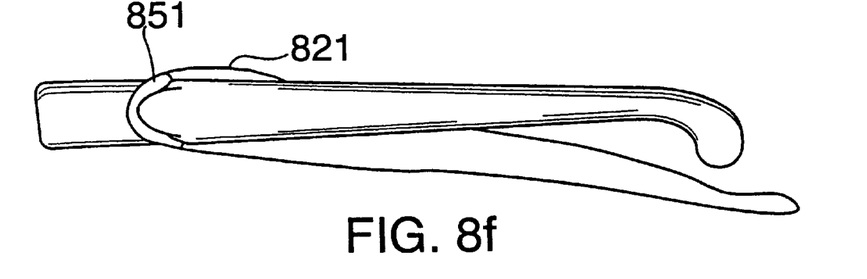
Figure 9A:
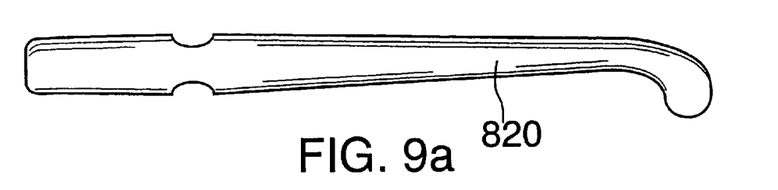
FIG. 9 is a sectional side view of an alternate embodiment of the retainer device showing temple pieces containing grooves.
Figure 9B:
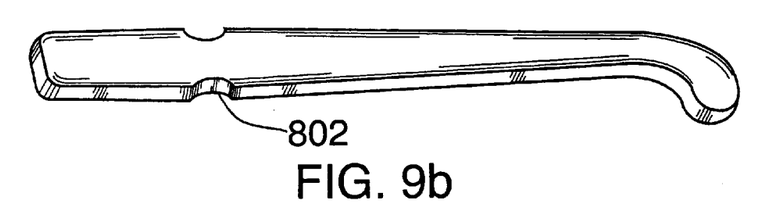
Figure 9C:
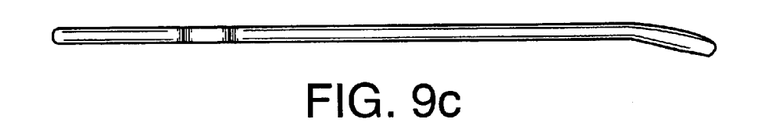
Figure 9D:
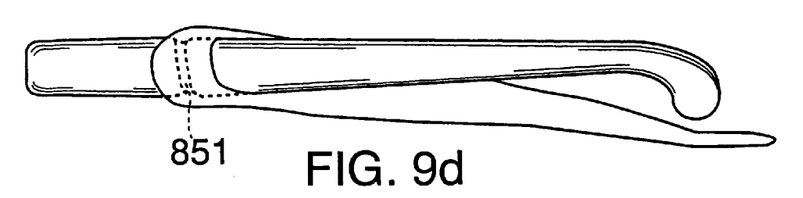
Figure 9E:
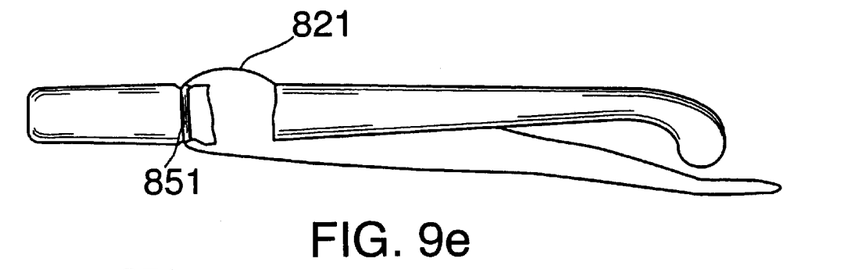
Figure 9F:
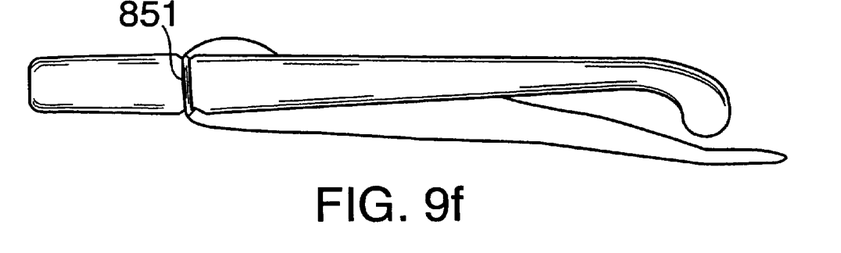

Alternatively to the tubular body 321 as shown in FIGS. 3–5, the shape of the retainer body of the present invention may be of any design that would substantially hide the attachment means 311, thereby maintaining an attractive appearance during use. In this embodiment, a part of the elastic band 351 is sewn into the body material which results in a partly circumferential retainer body 611 (FIGS. 6–7). When the elastic band 351 has been pulled into place, it contracts and bunches 621 the partly circumferential retainer body 611 over the front of the attachment means 311, and hides the attachment from view. This partly circumferential retainer body 611 will also ease installing and removing the retainer because pushing the temple pieces through the tubular retainer body will no longer be necessary.

Figure 10:
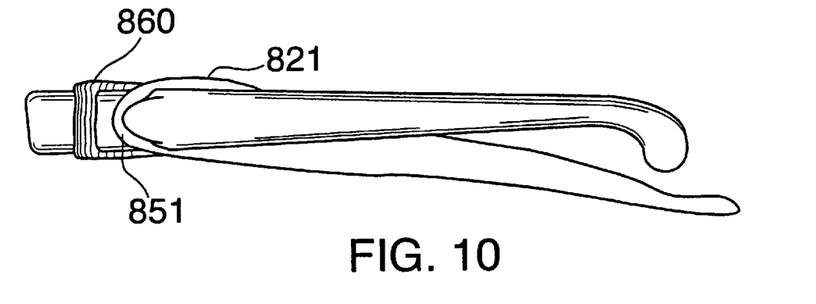
FIG. 10 is a sectional side view of an alternate embodiment of the retainer device showing temple pieces containing lips and the retainer containing an elastic sleeve located in front of the elastic band.

In the further embodiments shown in FIGS. 8–10, the attachment is achieved by incorporating a lip or a groove into the temple pieces to retain the elastic band 851. These embodiments show a positive attachment system where the elastic band 851 functions as the attachment mechanism when pressed against the lip or inserted into the groove of the temple pieces.

In FIGS. 8–9, embodiments are shown with elastic band 851 acting also as an attachment mechanism in combination with a retaining enclosure such as a lip 801 on temple piece 820 (FIG. 8) or with a groove 802 on temple piece 820 (FIG. 9). Because lip 801 provides a positive stop for elastic band 851 from sliding down temple piece 820, the movement of elastic band 851 is constrained by lip 801 thereby securing the attachment to temple piece 820. Although lip 801 is shown on the inside portion of the temple piece, it, or any other retaining enclosures, may also be located on the outside of the temple piece. Similarly, groove 802 holds elastic band 851 within it, thereby securing the attachment to temple piece 820 without slippage. Although in FIG. 8, lip 801 is shown as being unitary to temple piece 820, lip 801 or the other retaining enclosures need not be unitary to the temple pieces and may be comprised of a hooking device that is affixed to the temple piece or even a screw or peg affixed to the temple piece. In this way, the device can be adapted to eyeglasses without having to reconfigure the eyeglass temple pieces.

In FIG. 10, retainer 821 also contains an elastic sleeve 860 located forward of elastic band 851 to prevent forward slippage. Although FIG. 10 shows a single elastic sleeve 860, more than one elastic sleeve may be used on retainer 821.

Figure 11A:
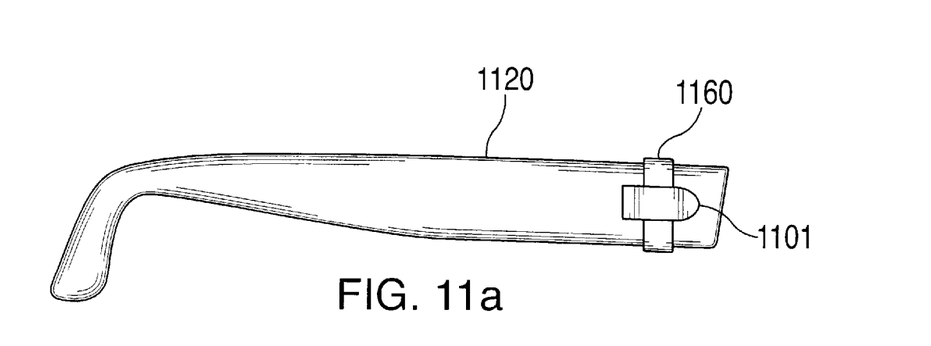
FIGS. 11a–11c are a sectional side view of an alternate embodiment of a retainer device showing a slip-on protuberance (e.g. a lip) as installed on the temple piece of a pair of eyeglasses.
Figure 11B:
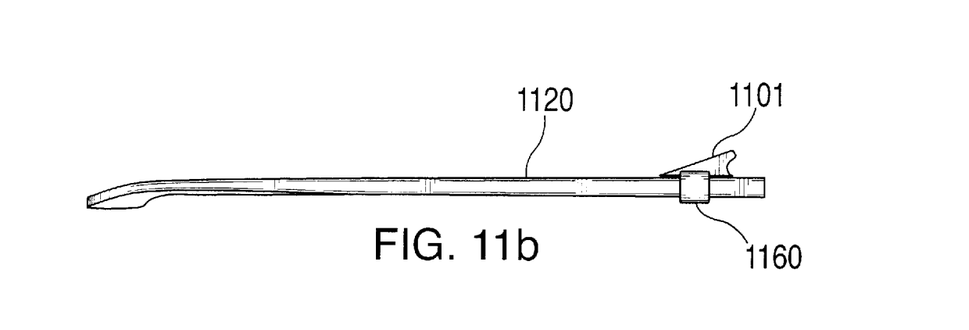
Figure 11C:
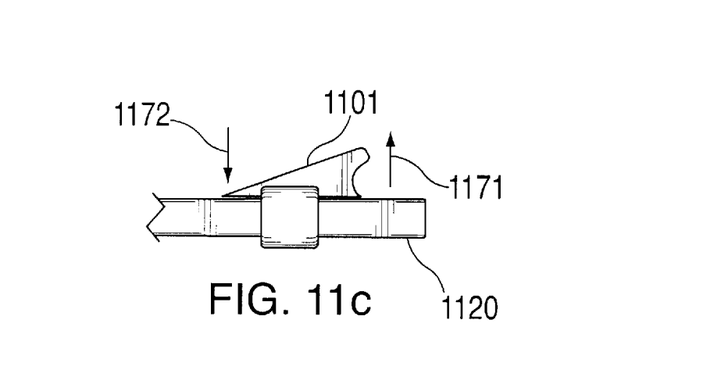
Figure 12A:
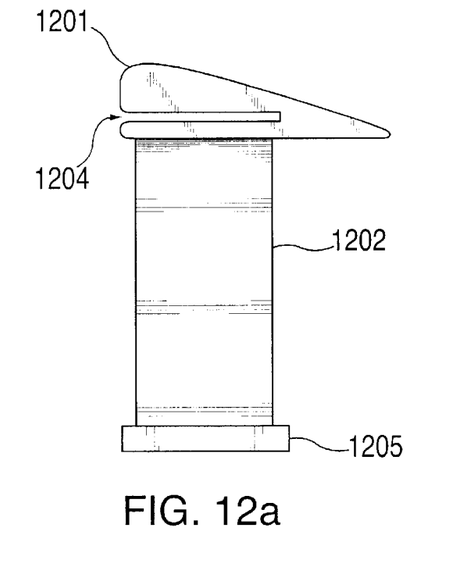
FIGS. 12a–12d show an alternate embodiment of a device for adding a protuberance to a conventional temple piece.
Figure 12B:
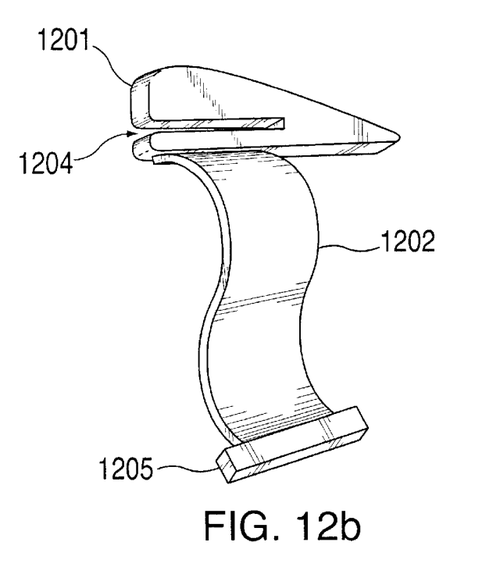
Figure 12C:
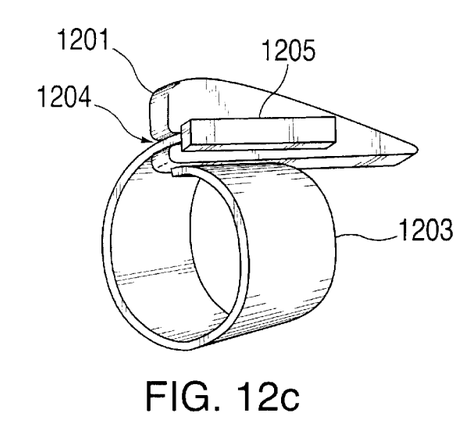
Figure 12D:
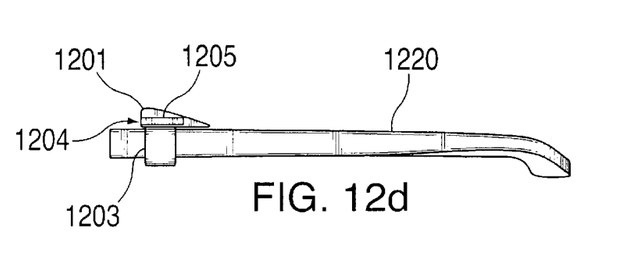
Figure 13A:
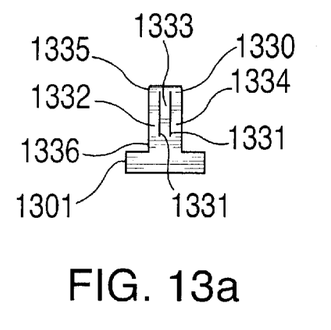
FIGS. 13a–13b a side view showing another alternate embodiment of a device for adding a protuberance to a conventional temple piece.
Figure 13B:
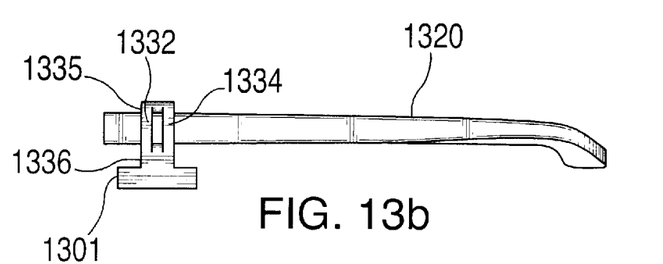

In yet further embodiments as shown in FIGS. 11–13, a positive attachment system is achieved by incorporating a device which adds a connecting protuberance (e.g. a lip) to an existing temple piece. This device incorporating a protuberance can be attached to a conventional eyeglass temple piece, for example, by using an elastic sleeve that slips on over the earpiece (FIG. 11), or by using a band which wraps around the temple piece and attaches to itself, forming a closed annulus around the temple piece (FIG. 12), or by using a slip-on device consisting of a protuberance connected to an attachment tab, wherein the tab has two vertical cuts so as to create an opening (FIG. 13a) through which the temple piece may slip (FIG. 13b). In these embodiments, the device positions the protuberance so that it can be engaged by the retaining enclosure of the eyeglass retainer while maintaining an aesthetically pleasing attachment.

FIGS. 11a–11c show an embodiment of a device that can be attached to the temple piece 1120 to provide a connecting protuberance 1101 (for example, a lip) without having to reconfigure the eyeglass temple piece 1120. In this embodiment, an elastic sleeve 1160, including a connecting protuberance 1101, slips on to the temple piece 1120 and is positioned so that the protuberance 1101 engages the retaining enclosure, thus providing a positive means of attachment. In this embodiment, the retaining enclosure is attached to the protuberance 1101 in such a way that any applied force against the protuberance 1101 from the eyeglass retainer (force up 1171) will be reacted against the temple piece 1120 (force down 1172), thus providing a positive attachment by preventing the device from slipping along the temple piece 1120.

As shown in FIGS. 12a–12d, a protuberance 1201 may be added to a conventional eyeglass temple piece 1220 by using a device incorporating a band 1202 that wraps around the temple piece 1220 and attaches to itself, thus forming a closed annulus 1203 around the temple piece 1220 and positioning the protuberance 1201 (see FIG. 12d) so as to provide a positive means of attachment for the retainer. In this embodiment, the device includes a connecting feature 1204 (for example, a slot) (see FIGS. 12a and 12b) which receives the free end 1205 of the band 1202, so that in the closed position (see FIG. 12c), the band 1202 attaches, forming an annulus 1203.

FIG. 13 shows an alternate embodiment of a device that can be attached to the temple piece 1320 to provide a connecting protuberance 1301 without having to reconfigure the eyeglass temple piece 1320. In this embodiment, the protuberance 1301 is connected to an attachment tab 1330, and a plurality of slits 1331 (for example, two) are made in the attachment tab 1330 so as to create separate, side-by-side segments 1332, 1333 and 1334 which may bend and therefore move relative to one another to form an opening that can accept the temple piece, but which segments are still connected to each other at the top 1335 of the attachment tab and at the bottom 1336 of the attachment tab. The eyeglass temple piece 1320 slips through said opening so that a number of the separate segments 1332, 1333 and 1334 are located on the inside of the temple piece 1320 while the remainder of the separate segments 1332, 1333 and 1334 are located on the outside of the temple piece 1320. In the embodiment shown in FIG. 13b, for example, the two outer segments 1332 and 1334 are located on one side of the temple piece 1320 while the inner segment 1333 (not shown) is located on the other side of the temple piece 1320. To achieve additional security against slippage, one of the segments 1332, 1333 and 1334 may be positioned so as to engage a protruding element (for example a lip or a groove) of the temple piece. The protuberance 1301 is thus positioned on the temple piece 1320 so as to provide a positive means of attachment for the eyeglass retainer.

Figure 14A:
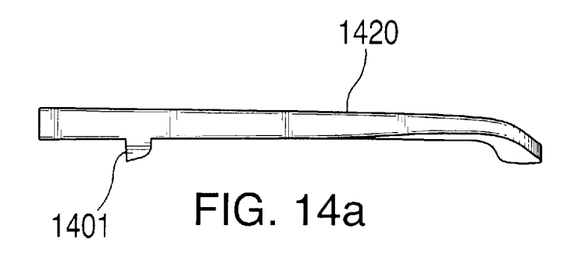
Figure 14B:
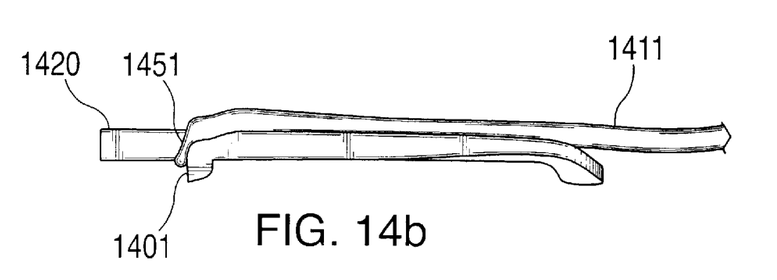
FIG. 14b shows the same view with the eyeglass retainer as installed on the temple piece.

FIG. 14 shows an embodiment in which a connecting protuberance 1401 is an existing, integral part of the eyeglass temple piece 1420, so that the retaining enclosure (for example, an elastic loop) may engage the protuberance to create a positive attachment system. As shown in FIG. 14a, an eyeglass temple piece 1420 has a protuberance 1401 in the shape of a "shark fin," although this embodiment of the invention is by no means limited to such a shape. In FIG. 14b, the retaining enclosure 1451 engages the protuberance 1401 to create a positive attachment system for the eyeglass retainer 1411 in an aesthetically pleasing way.

In another embodiment, a positive attachment may be achieved by incorporating an adhesive between the retainer and the temple piece. For example, an adhesive strip containing a peel-off paper cover may be attached inside an elastic sleeve that slips over the earpiece, so that when the paper cover is peeled away, exposing the adhesive, the adhesive is used to attach the eyeglass retainer securely to the temple piece.

A desirable characteristic in the retainer assembly is resiliency in the attachment system, so as to promote a snug fit on the wearer's head. The present invention does not limit ways in which such resiliency (if desired) may be introduced in the system. For example, straps (361) may be employed as shown to connect attachment means 311 (comprising parts 312, 313) to retainer body 321, and such straps may be made of elastic material. On the other hand, a direct connection can be made without such straps, and resiliency imparted by the overall "stretch" provided in the retainer material. Alternately, elastic or resilient material can be used elsewhere in the system. In any case, the present invention will be applicable and operable regardless of whether or how resiliency is introduced in the system.

In FIGS. 3–7, separate attachment means are not a part of the present invention. While shown in the embodiments as a two-part clip, it can be any other positive means of attachment, with or without a receiving element attached to the temple piece, such as an interlocking structure, as in Tabacchi (U.S. Pat. No. 4,743,105), hook and loop fasteners (as in Girard FR 2,704,658), a screw, a clamp, glue, adhesive, staples, one-piece plastic molding, etc. The present invention will work with each of such attachment means. All that is necessary are attachment means sufficiently compact so that the closure 351, 551, etc. can be pulled over it. Beyond that consideration, the type of attachment means employed, so long as it provides a positive, non-slipping attachment, is immaterial. Friction materials, adhesives, and/or indentations, perforations or protuberances may be added to the temple piece or attachment piece to increase friction and avoid slippage. An embodiment of a separate attachment piece providing an attachment means (e.g., a protuberance) that slips on over the temple piece is shown in FIG. 11. An alternate embodiment of such a separate attachment means is shown in FIG. 12, which incorporates a band that wraps around the temple piece and forms a closed annulus, thus holding an attachment means (e.g., a protuberance) in position on the temple piece, and in FIG. 13, which shows an alternate method for achieving a slip-on device incorporating such an attachment means. Such alternate embodiments may be combined with said friction material, indentation, perforation and/or protuberances.

It is apparent from the foregoing that an improved eyeglass retainer has been developed that accomplishes the stated objects of the invention. While the presently existing embodiments have been described in detail, it will be apparent to those skilled in the art that the principles of the invention are readily adaptable to other configurations of such apparatus without departing from the scope and spirit of the invention, as defined in the following claims.

I claim:

1. An improved eyeglass retainer for an eyeglass-retainer combination, in which the eyeglasses have frames having left and right temple pieces, said temple pieces having retaining enclosures contained thereon, the ends of said temple pieces located towards the eyeglass lenses being regarded as the front, and in which the retainer is positively attached to each of said temple pieces by engaging a protuberance comprising a structure added to each of said temple pieces, wherein said structure comprises a lip having a front end and a back end, said lip attached to an elastic sleeve, said elastic sleeve slipping over said temple piece so as to position said lip on said temple piece so that said eyeglass retainer engages said front end of said lip in such a way so that a force exerted on said front end of said lip by said eyeglass retainer causes a reaction force on said back end of said retainer against said temple piece, said reaction force providing a positive attachment of said lip and thereby said eyeglass retainer against said temple piece.

2. The improved eyeglass retainer of claim 1, further comprising a protuberance on said temple piece, wherein said structure engages said temple piece at said protuberance in an aesthetically pleasing way.

3. An improved eyeglass retainer for an eyeglass-retainer combination, in which the eyeglasses have frames having left and right temple pieces, said temple pieces having retaining enclosures contained thereon, the ends of said temple pieces located towards the eyeglass lenses being regarded as the front, and in which the retainer is positively attached to each of said temple pieces by engaging a protuberance comprising a structure added to each of said temple pieces, wherein said structure comprises a protuberance, said protuberance attached to a band having a connecting feature, said connecting feature comprising a free end and a receiving end of said band, said receiving end having an opening which engages said free end so as to create an annulus from said band, said annulus wrapping around said temple piece so as to position said protuberance on said temple piece so that said eyeglass retainer may engage said protuberance, said structure providing a positive attachment of said eyeglass retainer against said temple piece.

4. The improved eyeglass retainer of claim 3, further comprising a protuberance on said temple piece, wherein said structure engages said temple piece at said protuberance in an aesthetically pleasing way.

5. An improved eyeglass retainer for an eyeglass-retainer combination, in which the eyeglasses have frames having left and right temple pieces, said temple pieces having retaining enclosures contained thereon, the ends of said temple pieces located towards the eyeglass lenses being regarded as the front, and in which the retainer is positively attached to each of said temple pieces by engaging a protuberance comprising a structure added to each of said temple pieces, wherein said structure comprises a protuberance, said protuberance attached to an attachment tab having a top and a bottom, said attachment tab comprising a plurality of slits, said slits arranged generally in the direction between said top and said bottom of said attachment tab, said slits not extending into said top and said bottom of said attachment tab, said slits creating a plurality of separate, side-by-side segments of said attachment tab, said plurality of separate segments connected to one another at said top and said bottom of said attachment tab, said plurality of separate segments moving relative to one another to create an opening in said attachment tab, said temple piece slipping through said opening so that a number of said plurality of said separate segments are located on the inside of said temple piece and the remainder of said plurality of said separate segments are located on the outside of said temple piece, said temple piece slipping through said opening so as to position said protuberance on said temple piece so that said eyeglass retainer may engage said protuberance, said structure providing a positive attachment of said eyeglass retainer against said temple piece.

6. The improved eyeglass retainer of claim 5, further comprising a protuberance on said temple piece, wherein said structure engages said temple piece at said protuberance in an aesthetically pleasing way.

7. An improved eyeglass retainer for an eyeglass-retainer combination, in which the eyeglasses have frames having left and right temple pieces, said temple pieces having retaining enclosures contained thereon, the ends of said temple pieces located towards the eyeglass lenses being regarded as the front, and in which the retainer is positively attached in an aesthetically pleasing way to each of said temple pieces by engaging a protuberance comprising a structure that is an existing, integral part of each said temple piece.

8. The eyeglass retainer of claim 7, wherein said protuberance is in the shape of a shark fin.

9. The improved eyeglass retainer of claim 7, wherein said eyeglass retainer further comprises an adhesive.

10. An improved eyeglass retainer for an eyeglass-retainer combination, in which the eyeglasses have frames having left and right temple pieces, said temple pieces having retaining enclosures contained thereon, the ends of said temple pieces located towards the eyeglass lenses being regarded as the front, and in which the retainer is positively attached to each of said temple pieces by engaging a protuberance comprising a structure added to each of said temple pieces, wherein said eyeglass retainer further comprises an adhesive.

11. An improved eyeglass retainer for an eyeglass-retainer combination, in which the eyeglasses have frames having left and right temple pieces, said temple pieces having retaining enclosures contained thereon, the ends of said temple pieces located towards the eyeglass lenses being regarded as the front, said eyeglass retainer comprising an adhesive, wherein said retainer is positively attached to each said temple piece using said adhesive.

* * * * *